(12) United States Patent
Chang

(10) Patent No.: US 9,823,791 B2
(45) Date of Patent: Nov. 21, 2017

(54) TRANSMITTER, TOUCH SENSITIVE SYSTEM AND TRANSMITTING METHOD THEREOF

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 95 days.

(21) Appl. No.: 14/537,286

(22) Filed: Nov. 10, 2014

(65) Prior Publication Data

US 2015/0130757 A1    May 14, 2015

Related U.S. Application Data

(60) Provisional application No. 61/902,137, filed on Nov. 8, 2013.

(30) Foreign Application Priority Data

Sep. 19, 2014 (TW) .............................. 103132380 A

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC .... G06F 3/0418; G06F 3/0383; G06F 3/0416; G06F 3/044; G06F 3/03543; G06F 3/03545; G06F 3/0354; G06F 2203/0382; G06F 2203/04104
See application file for complete search history.

(56) References Cited

U.S. PATENT DOCUMENTS

| 5,365,253 A * | 11/1994 | Cheng ..................... G06F 3/046 178/20.01 |
| 2005/0189154 A1* | 9/2005 | Perski ................... G06F 3/0418 178/18.06 |
| 2010/0315384 A1* | 12/2010 | Hargreaves ......... G06F 3/03545 345/179 |

(Continued)

FOREIGN PATENT DOCUMENTS

| CN | 102884496 | 1/2013 |
| TW | 201106212 | 2/2011 |
| TW | 201243679 | 11/2012 |

*Primary Examiner* — Bryan Earles
(74) *Attorney, Agent, or Firm* — WPAT, PC

(57) ABSTRACT

The present invention provides a transmitter, which includes a transmitting module configured to transmit an electrical signal to a touch sensitive device according to at least one transmitter operating status such that the touch sensitive device acknowledges the transmitter operating status by analyzing the electrical signal including one or more first frequencies; a detecting module configured to detect an interference signal coherent to the electrical signal from a received signal external to the transmitter when the transmitting module is not transmitting the electrical signal; and a processing module configured to replace the detected one or more first frequencies with one or more second frequencies in response to the interference signal being detected by the detecting module.

28 Claims, 11 Drawing Sheets

(56) References Cited

U.S. PATENT DOCUMENTS

| | | | |
|---|---|---|---|
| 2011/0061947 A1* | 3/2011 | Krah | G06F 1/3215 |
| | | | 178/18.01 |
| 2011/0210939 A1 | 9/2011 | Reynolds et al. | |
| 2012/0326910 A1* | 12/2012 | Hargreaves | G08C 19/12 |
| | | | 341/176 |
| 2013/0027361 A1* | 1/2013 | Perski | G06F 3/0418 |
| | | | 345/178 |
| 2014/0098071 A1* | 4/2014 | Singh | G06F 3/038 |
| | | | 345/179 |
| 2014/0267059 A1* | 9/2014 | Deokar | G06F 3/0416 |
| | | | 345/173 |

\* cited by examiner

TRANSMITTER, TOUCH SENSITIVE SYSTEM AND TRANSMITTING METHOD THEREOF

BACKGROUND OF THE INVENTION

1. Field of the Invention

The present invention relates to transmitters applicable to touch sensitive panels, and more particularly, to a transmitter that is capable of replacing one or more frequencies when under interference.

2. Description of the Prior Art

Touch sensitive panels or screens are important human-machine interfaces, especially for consumer electronic products like portable phones, tablet PCs, or Personal Digital Assistances (PDAs). Touch sensitive screens are one of the main input/output (I/O) devices. As capacitive touch sensitive screens, especially those of projected capacitive types, are highly sensitive to finger touches, it has become one of the main design choices for touch sensitive panels/screens on the market.

Touching the screen with the tip of a finger will inevitably block part of the screen, and the user will not be able to visually confirm a point that is being detected by the touch sensitive. In addition, one cannot have as accurate control as using a pen (or stylus) when using their finger tip(s) to write. Therefore, in addition to using finger tips for touch control, users may also wish to use a stylus for input to the screen.

Generally, the area on a touch sensitive screen touched by the tip of a stylus is much smaller than that touched by the fingertips. For capacitive touch sensitive screens, it has been a challenge to detect the capacitive changes caused by a stylus. In particular, in many professional graphics or typesetting application environments, a lot of functional buttons needs to be added in the design process of the stylus. In view of this demand, the touch sensitive screen not only needs to detect the tiny tip of the stylus, but also needs to determine whether these buttons are being pressed.

Furthermore, there are many electromagnetic interferences in the modern environment in which we live in. In addition to achieving the objectives above, the screen needs to be able to avoid these electromagnetic interferences when trying to detect the stylus. In summary, there is a need on the market for a stylus that supports multiple function inputs when subjected to electromagnetic interferences, thereby allowing a touch sensitive screen to detect the stylus while detecting the statues of the functional buttons.

SUMMARY OF THE INVENTION

In an embodiment, the present invention provides a transmitter, which may include a transmitting module configured to transmit an electrical signal to a touch sensitive device according to at least one transmitter operating status such that the touch sensitive device acknowledges the transmitter operating status by analyzing the electrical signal including one or more first frequencies; a detecting module configured to detect an interference signal coherent to the electrical signal from a received signal external to the transmitter when the transmitting module is not transmitting the electrical signal; and a processing module configured to replace the detected one or more first frequencies with one or more second frequencies in response to the interference signal being detected by the detecting module.

In another embodiment, the present invention provides a transmitting method applicable to a transmitter, which may include the following steps of: transmitting an electrical signal to a touch sensitive device according to at least one transmitter operating status such that the touch sensitive device acknowledges the transmitter operating status by analyzing the electrical signal including one or more first frequencies; determining if an interference signal coherent to the electrical signal is included in a received signal external to the transmitter when the electrical signal is not being transmitter; and replacing the detected one or more first frequencies in the electrical signal with one or more second frequencies in response to the interference signal being detected.

In yet another embodiment, the present invention provides a touch sensitive system that may include the above touch sensitive device and the transmitter.

In summary, one of the main principles of the present invention lies in determining if an interference signal existing in the touch sensitive system is coherent to the electrical signal sent by the transmitter. When there is coherency, one or more frequencies making up the electrical signal is/are replaced to avoid interference.

DETAILED DESCRIPTION OF THE PREFERRED EMBODIMENTS

Figure 1:
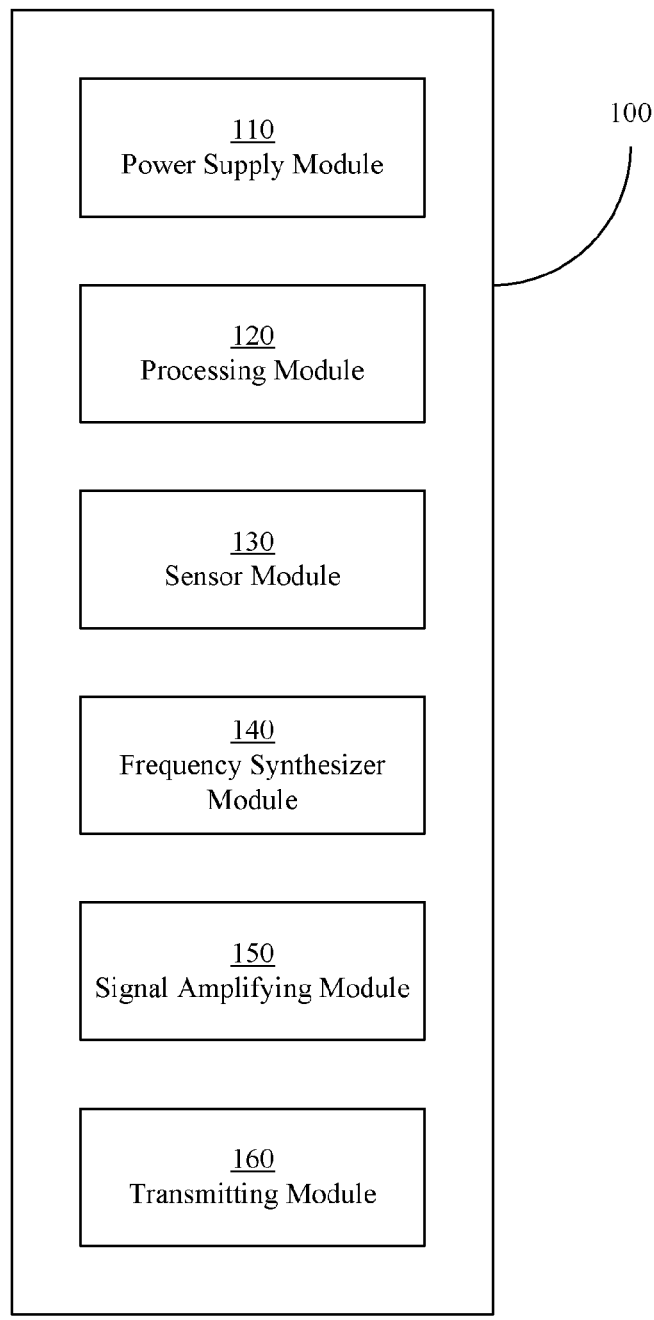
FIG. 1 is a schematic diagram illustrating a transmitter in accordance with an embodiment of the present invention.

The present invention is described in details with reference to some embodiments below. However, in addition to the disclosed embodiments, the scope of the present invention is not limited by these embodiments, rather by the scope of the claims. Moreover, in order for one with ordinary skills in the art to have a better understanding and clarity of the descriptions, some components in the drawings may not necessary be drawn to scale, in which some may be exaggerated relative to others, and irrelevant parts are omitted.

In an embodiment, the transmitter mentioned in the present invention may be a stylus. In some embodiments, the transmitter may be other types of objects that can be placed on a touch sensitive panel or screen. For example, when the touch sensitive screen displays a chessboard, the transmitter may be the chess. Once the game program detects the location of the chess on the touch sensitive screen, it will know the location of the chess.

Regardless of how much contact area there is between the transmitter and the touch sensitive panel and how many touch points there are, the transmitter at least includes a transmitting anchor point. The touch sensitive panel or screen may detect the location of the transmitting anchor point as the representative location of an object represented by the transmitter on the touch sensitive panel or screen. In an embodiment, the transmitter does not need to come into contact with the touch sensitive panel, only the transmitting anchor point needs to be in proximity to the touch sensitive panel for the touch sensitive panel to detect the transmitting anchor point.

In an embodiment, the transmitter may include a plurality of transmitting anchor points. When the touch sensitive panel detects a plurality of transmitting anchor points, it is able to detect the facing direction of the transmitter. In another embodiment, the transmitter may include m transmitting anchor points, and when the touch sensitive panel detects n of the transmitting anchor points, it is able to detect the stance of the transmitter on the touch sensitive panel. For example, the transmitter is a triangular body with four transmitting anchor points; each transmitting anchor point is positioned at one vertex of the triangular body, by detecting three transmitting anchor points on the touch sensitive panel, the touch sensitive panel will be able to know which face of the triangular body is in contact with it. The transmitter may also be a square body with eight transmitting anchor points, where each transmitting anchor point is positioned at a vertex of the square body. This type of transmitter can be used as a dice.

Referring to FIG. 1, a schematic diagram illustrating a transmitter 100 in accordance with an embodiment of the present invention is shown. The transmitter 100 includes a power supply module 110, a processing module 120, a sensor module 130, a frequency synthesizer module 140, a signal amplifying module 150 and a transmitting module 160. As mentioned above, the transmitter 100 may assume the shape of a stylus. In an embodiment, the above modules may be arranged inside the stylus according to the order shown in FIG. 1, the bottom of the stylus is to be in contact with or proximity to a touch sensitive panel. The transmitter 100 may include a master switch for turning on/off the power of the transmitter 100.

The power supply module 110 may include circuits associated with power supply and control, such as a battery pack, a DC-to-DC voltage converter, a power management unit and the like. The battery pack can be rechargeable batteries or disposable batteries. When the battery pack includes rechargeable batteries, the power supply module 110 may further include a charger circuit for inputting external power into the rechargeable batteries. In addition, external power may be input into the charger circuit in a wireless manner, or the battery pack may be replaced by capacitors. In an embodiment, the charger circuit can be included in the power management unit for protecting the rechargeable batteries from over discharging and over charging.

The above processing module 120 is used for controlling the transmitter 100, and may include a microprocessor. The above sensor module 130 may include at least one sensor. The sensor may, for example, include a pressure sensor at the tip of the stylus, a button, an accelerometer, an inductance meter, a knob, or the like. The status of the sensor may be in a binary form. For example, the button may be in either a pressed-down status or a released status. The statuses of an accelerometer may include stationary and in-motion. The statuses of the sensor may also include n-ary discrete values. For example, the pressure experienced by the pressure sensor may be divided into four levels, ten levels, or sixteen levels. The statuses of the knob may also be in four levels, eight levels, or sixteen levels. The status of the sensor can also be an analog interval. The above processing module 120 is able to detect the status of the sensor in the sensor module 130, and generate a transmitter operating status accordingly. Fr example, an elastic member is connected to the tip of a stylus. When the tip of the stylus is being pressed, the elastic member will deform due to pressure. The aforementioned pressure sensor is connected to the elastic member to detect the pressure experienced by the elastic member. The aforementioned elastic element can be a spring, an elastic rubber or foam, or other pressure structure or material that can buffer pressure so that the tip of the stylus moves with respect to the body of the stylus; the present invention is not limited to these examples. In addition, the aforementioned pressure sensor may include a piezoelectric material, which produces electrical signals when deformed.

The above frequency synthesizer module 140 includes a plurality of frequency generators and a frequency synthesizer or mixer. In one embodiment, the above plurality of frequency generators may include a plurality of quartz oscillators. In another embodiment, the above frequency generators can use a single frequency source, and generate a plurality of frequencies through the use of dividers, frequency multipliers, phase lock circuits and other appropriate circuitries. These frequencies are not mutually resonant frequency waves, and different from and not mutually resonant with the frequency emitted by the touch sensitive panel for detecting the transmitter 100. This avoids interference between the various frequencies.

In some embodiments, the ranges of the plurality of frequencies fall within the detectable frequency range of the touch sensitive panel. For example, a frequency range that generally can be detected by a touch sensitive panel is approximately between 90 kHz and 250 kHz, so the frequencies generated by the plurality of frequency generators may fall within this range.

In an embodiment, the above processing module 120 may decide which frequencies in the plurality of frequencies are to be synthesized by the frequency synthesizer module 140. In other words, a specific frequency can be controlled not to be added to the mixer. Of course, the signal strength of an individual frequency may also be controlled. In another embodiment, the above processing module 120 may decide the ratios of the signal strengths of the various frequencies for the frequency synthesizer module 140. For example, the ratio of the signal strength of a first frequency to that of a second frequency may be 3:7. As another example, the ratio of the signal strengths between a first, a second and a third frequency may be 24:47:29. One with ordinary skills in the art can appreciate that although the frequency synthesizer module 140 can be used for generating and mixing multiple frequencies, the processing module 120 may also instruct the frequency synthesizer module 140 to generate a single frequency without mixing with any other frequencies based on the statuses of the sensors in the sensor module 130.

In an embodiment, the signal strength of a particular frequency may correspond to a pressure sensor at the tip of the stylus or a knob with multiple levels in the sensor module 130. For example, in a graphics software, the pressure sensor at the tip of a stylus may indicate the shades of the color, and the degree of rotation of the knob may indicate the diameter of the brush. Thus, the signal strength of a first frequency can be used to indicate the pressure on the pressure sensor, and the signal strength of a second frequency can be used to indicate the degree of rotation of the knob.

In another embodiment, the proportion of the signal strength of one frequency among the signal strength of the mixed frequencies can be used to correspond to one of the n-ary statuses of a sensor. For example, when the ratio of the signal strengths of a first frequency to a second frequency is 3:7, it indicates the status of the sensor is in the third level among ten levels. If the ratio of the strengths is changed to 6:4, this indicates the status of the sensor is in the sixth level among ten levels. In other words, if there are three frequencies, then the ratio of the signal strengths of a first frequency to a second frequency, the ratio of the signal strengths of the second frequency to a third frequency, and the ratio of the signal strengths of the third frequency to the first frequency can be used to indicate three statuses of the n-ary sensor, respectively.

The above signal amplifying module 150 is used for amplifying the signal mixed by the frequency synthesizer module 140. In an embodiment, the above signal amplification corresponds to the pressure sensor in the sensor module 130 at the tip of the stylus. If the circuit of the pressure sensor corresponds to a variable gain amplifier (VGA) of the signal amplifying module 150, the circuit of the pressure sensor may directly control the gain of the VGA without going through the processing module 120. Therefore, the mixed signal outputted by the frequency synthesizer module 140 can be amplified by the VGA and sent to the transmitting module 160.

As mentioned before, the signal strength of a particular frequency in the mixed signal can be used to indicate a status of an n-ary sensor. The ratio of the signal strengths of two frequencies in the mixed can also be used to indicate a status of a n-ary sensor. Alternatively, the overall signal strength of the mixed signal can be used to indicate a status of a n-ary sensor. Meanwhile, the signal amplifying module 150 can be use to amplify the mixed signal to indicate the status of another n-ary sensor. For example, the transmitter 100 includes two n-ary sensors: one is a pressure sensor provided at the tip of the stylus, and the second one is a knob provided on the body of the stylus. They are used to indicate the color shade and the diameter of the stylus, respectively. In an embodiment, the strength of the mixed signal can be used to indicate the amount of pressure experienced by the pressure sensor. The status of the knob can be indicated by the ratio of the signal strengths of two frequencies in the mixed signal. Alternatively, a particular status of the knob can be indicated by amplifying or reducing the strength of the overall mixed signal to a specific level through the signal amplifying module 150.

In an embodiment of the present invention, the transmitting module 160 includes a pressure sensor provided at the tip of the stylus. The transmitting module 160 can be an array of antennas or a conductor or an electrode with the appropriate impedance value, which can also be called an excitation electrode. The conductor or electrode at the tip of the stylus is connected to the pressure sensor. When the transmitting module 160 emits a signal and touches the touch sensitive panel/screen, the signal will flow into the sensing electrodes of the touch sensitive panel/screen. When the transmitting module 160 is near but not in contact with the touch sensitive panel/screen, the sensing electrodes of the touch sensitive panel/screen may still experience the signal variations on the transmitting module 160, thereby allowing the touch sensitive/panel to detect the approaching of the transmitter 100.

When the frequency synthesizer module 140 synthesizes n frequencies, the frequencies of the signal can be used to modulate $2^n$ operating statues. For example, when n equals to three, the frequencies of the signal can be used to modulate eight operating statues. Referring to Table 1, the transmitter operating statuses and their corresponding statuses of the sensors are shown.

TABLE 1

| | Pressure Sensor | First Button | Second Button |
|---|---|---|---|
| First Transmitter Operating Status | Contact Pressure | Released | Released |
| Second Transmitter Operating Status | Contact Pressure | Pressed | Released |
| Third Transmitter Operating Status | Contact Pressure | Pressed | Pressed |
| Fourth Transmitter Operating Status | Contact Pressure | Released | Pressed |
| Fifth Transmitter Operating Status | No Contact Pressure | Released | Released |
| Sixth Transmitter Operating Status | No Contact Pressure | Pressed | Released |
| Seventh Transmitter Operating Status | No Contact Pressure | Pressed | Pressed |
| Eighth Transmitter Operating Status | No Contact Pressure | Released | Pressed |

In the embodiment shown by Table 1, the sensor module 130 includes three sensors: a pressure sensor at the tip of the stylus, a first button and a second button. The status of these three sensors are all in binary forms, so there are eight different combinations of transmitter operating statuses in total, as shown in Table 1. One with ordinary skills in the art can appreciate that the correspondence between the transmitter operating statuses and the sensors' statuses can be arbitrarily changed. For example, the first transmitter operating status can swap with another transmitter operating status, for example, the seventh transmitter operating status.

Referring to Table 2, the transmitter operating statuses and their corresponding frequency mixings are shown. As described before, the frequency synthesizer module 140 may synthesize three different frequencies, so each transmitter operating status may correspond to a different combination of the frequencies as shown in Table 2. One with ordinary skills in the art can appreciate that the correspondence between the transmitter operating statuses and the combinations of frequencies can be arbitrarily changed. For example, the first transmitter operating status can swap with another transmitter operating status, for example, the eighth transmitter operating status.

TABLE 2

|  | First Frequency | Second Frequency | Third Frequency |
|---|---|---|---|
| First Transmitter Operating Status | Mixed | Mixed | Mixed |
| Second Transmitter Operating Status | Mixed | Mixed | Not Mixed |
| Third Transmitter Operating Status | Mixed | Not Mixed | Not Mixed |
| Fourth Transmitter Operating Status | Mixed | Not Mixed | Mixed |
| Fifth Transmitter Operating Status | Not Mixed | Mixed | Mixed |
| Sixth Transmitter Operating Status | Not Mixed | Mixed | Not Mixed |
| Seventh Transmitter Operating Status | Not Mixed | Not Mixed | Not Mixed |
| Eighth Transmitter Operating Status | Not Mixed | Not Mixed | Mixed |

In an embodiment, when the pressure sensor at the tip of the stylus is not under any pressure, the transmitter 100 still mixes the frequencies and sends out a signal. In another embodiment, when the pressure sensor at the tip of the stylus is not under any pressure, the transmitter 100 does not mix the frequencies and transmit any signal. With respect to Table 2, this status is the seventh transmitter operating status. In this embodiment, Table 1 can be altered into Table 3.

TABLE 3

|  | Pressure Sensor | First Button | Second Button |
|---|---|---|---|
| First Transmitter Operating Status | Contact Pressure | Released | Released |
| Second Transmitter Operating Status | Contact Pressure | Pressed | Released |
| Third Transmitter Operating Status | Contact Pressure | Pressed | Pressed |
| Fourth Transmitter Operating Status | Contact Pressure | Released | Pressed |
| Seventh Transmitter Operating Status | No Contact Pressure | Released | Released |
| Seventh Transmitter Operating Status | No Contact Pressure | Pressed | Released |
| Seventh Transmitter Operating Status | No Contact Pressure | Pressed | Pressed |
| Seventh Transmitter Operating Status | No Contact Pressure | Released | Pressed |

In the embodiments shown in Table 1 to Table 3, the transmitter 100 uses the synthesizing of the frequencies as the only factor of signal modulation. In the following embodiments, in addition to frequency synthesizing, signal strength and/or ratio of signal strengths of different frequencies are included as the factors of signal modulation.

Referring to Table. 4, transmitter frequency statuses and their corresponding sensors' statuses in accordance with an embodiment of the present invention are shown. Compared to the embodiment shown in Table 1, the statues sensed by the pressure sensor are not limited to two statuses (i.e. contact pressure/no contact pressure), but more than two statuses. Thus, the left column of Table 4 is not called transmitter operating status anymore, but rather transmitter frequency status. The modulation factors of the transmitter operating status of this embodiment include, in addition to the frequency status, the signal strength as well.

TABLE 4

|  | Pressure Sensor | First Button | Second Button |
|---|---|---|---|
| First Transmitter Frequency Status | Contact Pressure Level >0 | Released | Released |
| Second Transmitter Frequency Status | Contact Pressure Level >0 | Pressed | Released |
| Third Transmitter Frequency Status | Contact Pressure Level >0 | Pressed | Pressed |
| Fourth Transmitter Frequency Status | Contact Pressure Level >0 | Released | Pressed |
| Fifth Transmitter Frequency Status | Contact Pressure Level = 0 | Released | Released |
| Sixth Transmitter Frequency Status | Contact Pressure Level = 0 | Pressed | Released |
| Seventh Transmitter Frequency Status | Contact Pressure Level = 0 | Pressed | Pressed |
| Eighth Transmitter Frequency Status | Contact Pressure Level = 0 | Released | Pressed |

Referring to Table 5, transmitter operating statuses and their corresponding frequency mixings and signal strengths in accordance with an embodiment of the present invention are shown. The signal strength modulation can be the signal strength value of the mixed signal to indicate, for example, the contact pressure level of the pressure sensor.

TABLE 5

|  | First Frequency | Second Frequency | Third Frequency |
|---|---|---|---|
| First Transmitter Frequency Status + Signal Strength Modulation | Mixed | Mixed | Mixed |
| Second Transmitter Frequency Status + Signal Strength Modulation | Mixed | Mixed | Not Mixed |
| Third Transmitter Frequency Status + Signal Strength Modulation | Mixed | Not Mixed | Not Mixed |
| Fourth Transmitter Frequency Status + Signal Strength Modulation | Mixed | Not Mixed | Mixed |
| Fifth Transmitter Frequency Status + Signal Strength Modulation | Not Mixed | Mixed | Mixed |
| Sixth Transmitter Frequency Status + Signal Strength Modulation | Not Mixed | Mixed | Not Mixed |
| Seventh Transmitter Frequency Status + Signal Strength Modulation | Not Mixed | Not Mixed | Not Mixed |
| Eighth Transmitter Frequency Status + Signal Strength Modulation | Not Mixed | Not Mixed | Mixed |

In the embodiment of Table 5, the contact pressure levels of the pressure sensor corresponding to the fifth to the eighth transmitter frequency statues are all zero, so the results of signal strength modulation can also be zero. In other words, no signal is transmitted. In another embodiment, such a signal strength modulation can be a constant. This constant signal strength can be different from the signal strengths corresponding to other contact pressure levels of the pressure sensor.

Figure 2:
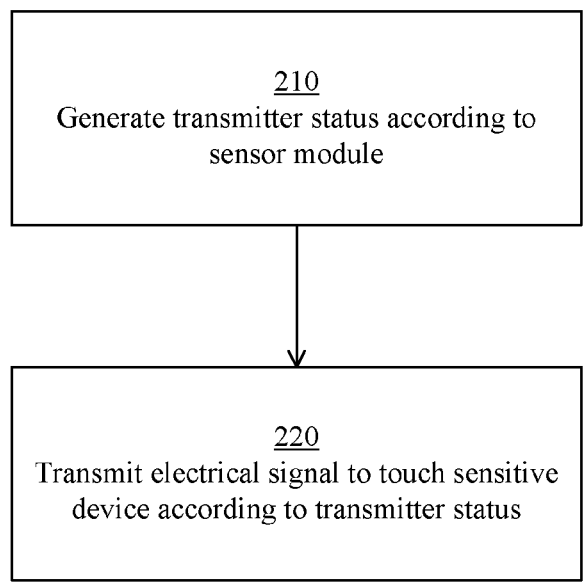
FIG. 2 is a flowchart illustrating a transmitting method in accordance with an embodiment of the present invention.

Referring to FIG. 2, a flowchart illustrating a transmitting method in accordance with an embodiment of the present invention is shown. The transmitting method is applicable to the transmitter 100 shown in FIG. 1, but not limited thereto. The transmitting method includes two steps. In step 210, a transmitter operating status is generated based on a status inside a sensor module included in the transmitter. In step 220, an electrical signal is transmitted to a touch sensitive device according to the transmitter operating status, so that after analyzing the electrical signal, the touch sensitive device is able to find out the transmitter operating status and a relative position of the transmitter with respect to the touch sensitive device. The electrical signal is mixed from a plurality of signals having different frequencies.

In an embodiment, a sensor inside the sensor module includes one of the following: a button, a knob, a pressure sensor (or a pressure gauge), an accelerometer or a gyroscope. The pressure sensor can be used to sense the level of contact pressure between the transmitter and the touch sensitive device.

When the sensor module includes a plurality of sensors, the number of possible statues of the transmitter operating status is the sum of the number of possible statues of every sensor. Alternatively, in another embodiment, the transmitter operating status indication is one of arbitrary combinations of every sensor's status indication. In an embodiment, the status indication of a sensor inside the sensor module is the nth power of two, wherein n is an integer greater than or equal to 0.

The modulation factor of the electrical signal includes one or a combination of: frequency and strength. In an embodiment, the signal strength of the electrical signal corresponds to a status of an n-ary sensor in the sensor module. In another embodiment, the ratio of signal strengths of a first frequency to a second frequency mixed in the electrical signal corresponds to a status of an n-ary sensor in the sensor module. In yet another embodiment, the total signal strength of the electrical signal corresponds to a status of a first n-ary sensor in the sensor module, wherein the ratio of the signal strengths of a first frequency to a second frequency mixed in the electrical signal corresponds to a status of a second n-ary sensor in the sensor module.

One main principle of the present invention lies in the use of an electrical signal mixed from a plurality of frequencies, so that a touch sensitive device may be able to detect the position of a transmitter transmitting the electrical signal and the status of at least one sensor on the transmitter.

Figure 3:
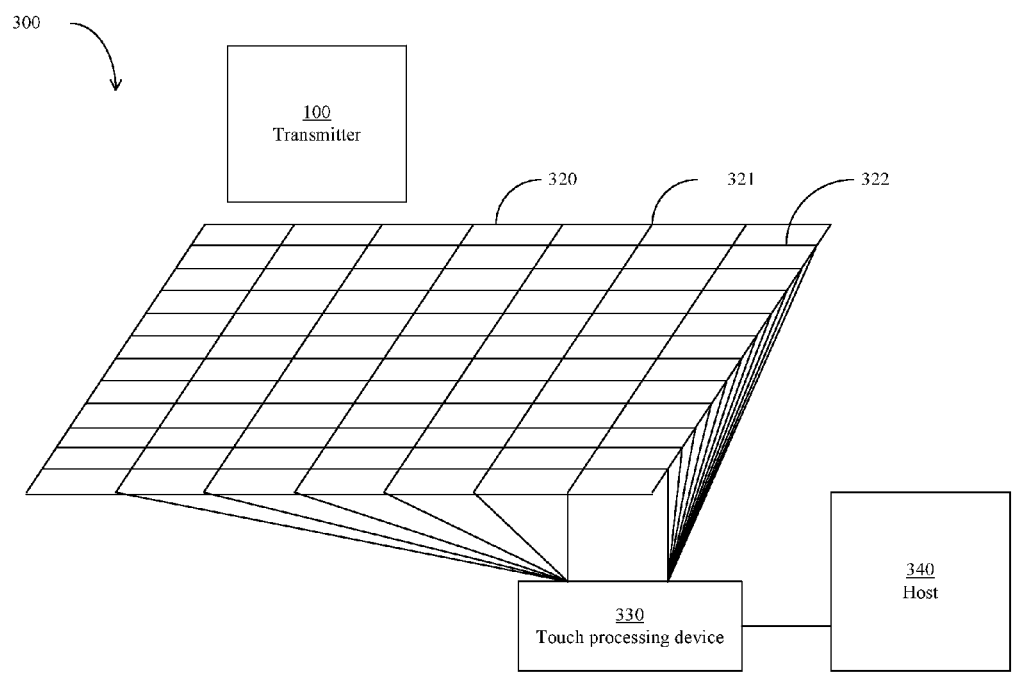
FIG. 3 is a schematic diagram depicting a touch sensitive system in accordance with an embodiment of the present invention.

Referring now to FIG. 3, a schematic diagram depicting a touch sensitive system 300 in accordance with an embodiment of the present invention is shown. The touch sensitive system 300 includes at least one transmitter 100, a touch sensitive panel 320, a touch processing device 330 and a mainframe 340. In this embodiment, the transmitter 100 is applicable to the transmitters described in the previous embodiments, especially the embodiments shown in FIGS. 1 and 2. It should also be noted that the touch sensitive system 300 may include a plurality of transmitters 100. The touch sensitive panel 320 is formed on a substrate. The touch sensitive panel 320 can be a touch sensitive screen, but the present invention does not restrict the form of the touch sensitive panel 320.

In an embodiment, a touch sensitive area of the touch sensitive panel 320 includes a plurality of first electrodes 321 and a plurality of second electrodes 322. A plurality of sensing points are formed at the intersections of these two electrodes. These first electrodes 321 and second electrodes 322 are connected to the touch processing device 330. Under mutual capacitive sensing, the first electrodes 321 can be called first conductive strips or driving electrodes and the second electrodes 322 can be called second conductive strips or sensing electrodes. The touch processing device 330 is able to know the approach or touch (approach/touch) of any external conductive object on the touch sensitive panel 320 by first providing a driving voltage (the voltage of a driving signal) to the first electrodes 321 and then measuring the signal variations of the second electrodes 322. One with ordinary skills in the art can appreciate that the touch processing device 330 may use mutual- or self-capacitive sensing methods to detect an approaching/touching event or object, and they will not be further described. In addition to mutual- or self-capacitive sensing methods, the touch processing device 330 may also detect the electrical signal emitted by the transmitter 100 in order to detect the relative position of the transmitter 100 with respect to the touch sensitive panel 320. In one embodiment, the signal variations of the first electrodes 321 and the second electrodes 322 are measured to detect the signals of the transmitter 100 in order to determine the relative position of the transmitter 100 with respect to the touch sensitive panel 320. Since the frequency of the signals of the transmitter 100 are different from those of the mutual-capacitive or self-capacitive driving signals, and neither are they mutually resonant, the touch processing device 330 is able to distinguish between the signals sent from the transmitter 100 and the mutual-capacitive or self-capacitive signals. The detection principle will be detailed in the later sections of the specification. In another embodiment, the touch sensitive panel 320 can be a surface capacitive touch sensitive panel, wherein an electrode is at each of the four corners or sides. The touch processing device 330 measures the signal variations of these four electrodes simultaneously or sequentially to determine the relative position of the transmitter 100 with respect to the touch sensitive panel 320.

FIG. 3 further includes a mainframe 340, which can be an operating system such as a CPU or a main processor in an embedded system, or other types of computers. In an embodiment, the touch sensitive system 300 can be a table PC. The mainframe 340 can be a CPU for executing the operating programs of the table PC. For example, the table PC executes an Android operating system, and the mainframe 340 is an ARM processor executing the Android operating system. The present invention does not limit the form of information transmission between the mainframe 340 and the touch processing device 330 as long as the information transmitted is relevant to the approaching/touching event(s) happened on the touch sensitive panel 320.

Figure 4:
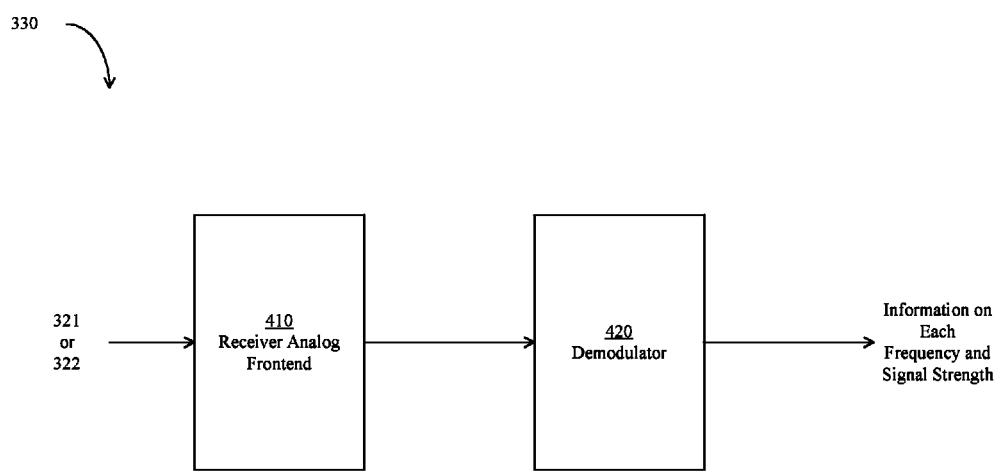
FIG. 4 is a block diagram depicting a portion of the touch processing device in accordance with an embodiment of the present invention.

Referring to FIG. 4, a block diagram depicting a portion of the touch processing device 330 in accordance with an embodiment of the present invention is shown. As mentioned earlier, the touch processing device 330 may use mutual- or self-capacitive sensing principle to detect an approaching/touching event, so details related to capacitive sensing will not be described hereinafter. The embodiment shown in FIG. 4 includes a receiver analog front end 410 and a demodulator 420.

The receiver analog front end 410 is connected to the first electrodes 321 or the second electrodes 322 described before. In an embodiment, each of the first electrodes 321 and each of the second electrodes 322 are connected to a receiver analog front end 410, respectively. In another embodiment, a plurality of first electrodes 321 form a set, and a plurality of second electrodes 322 form a set, and each set of first electrodes 321 corresponds to a receiver analog front end 410, and each set of second electrodes 322 corresponds to another receiver analog front end 410. Each receiver analog front end 410 receives in turn the signal of the first electrodes 321 or second electrodes 322 in the set. In another embodiment, a set of first electrodes 321 and a set of second electrodes 322 correspond to one receiver analog front end 410. The receiver analog front end 410 can first be connected in turn to the first electrodes 321 in the set of the first electrodes 321, and then connected in turn to the second electrodes 322 in the set of the second electrodes 322. On the contrary, the receiver analog front end 410 can first be connected in turn to the second electrodes 322 in the set of the second electrodes 322, and then connected in turn to the first electrodes 321 in the set of the first electrodes 321. In an embodiment, the touch processing device 330 may include only one receiver analog front end 410. One with ordinary skills in the art can appreciate that the present invention does not limit how the first electrodes 321 or the second electrodes 322 are configured to the receiver analog front end 410. In other words, the number of receiver analog front ends 410 included in the touch processing device 330 may be smaller than or equal to the sum of the first electrodes 321 and the second electrodes 322.

The receiver analog front end 410 may perform some filtering, amplifying or other types of analog signal processing. In some embodiments, the receiver analog front end 410 can receive the difference between two adjacent first electrodes 321, or the difference between two adjacent second electrodes 322. In an embodiment, each receiver analog front end 410 can output to a demodulator 420. In another embodiment, every $n^{th}$ receiver analog front end 410 may output to a demodulator 420. In yet another embodiment, each receiver analog front end 410 may output to N demodulators 420, wherein N is a positive integer greater than or equal to one. In some embodiments, the touch processing device 330 may include only one demodulator 420. One with ordinary skills in the art can appreciate that the present invention does not limit how the receiver analog front end(s) 410 is/are configured to the demodulator(s) 420.

The demodulator 420 is used to demodulate the electrical signal transmitted by the transmitter 100 in order to obtain information on each frequency and information on the signal strengths in the received signals of the corresponding first electrodes 321 or second electrodes 322. For example, the transmitter 100 may transmit a signal having three frequencies. The demodulator 420 may obtain the signal strengths for the three respective frequencies, the ratio(s) of signal strengths of each two or arbitrary two frequencies, and the overall signal strength. In the present invention, the demodulator 420 can be implemented in a digital or analog way; it is described in the following three embodiments.

Figure 5:
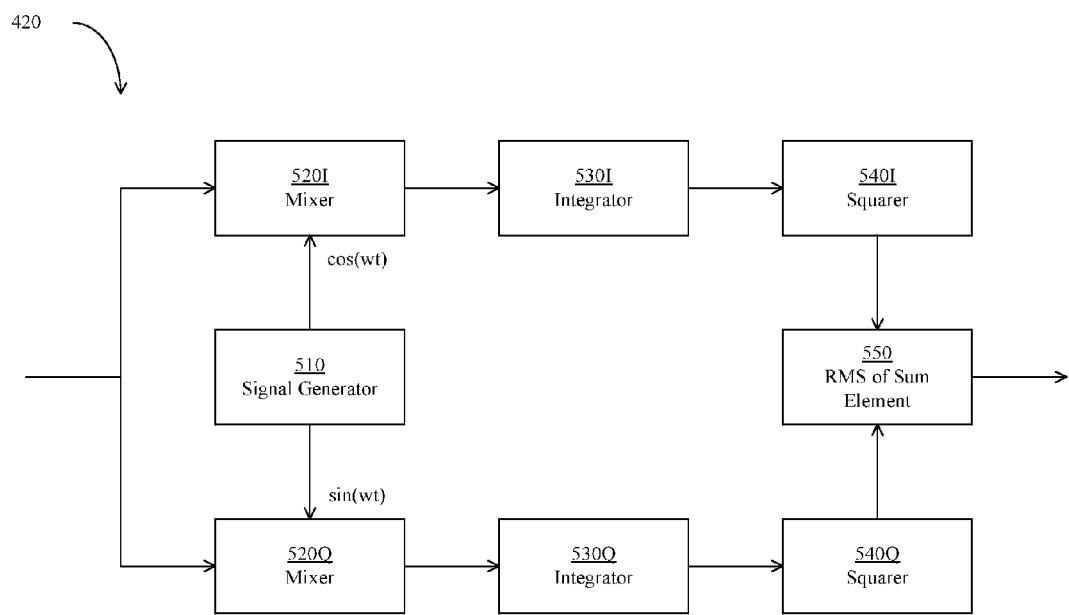
FIG. 5 is a block diagram depicting a portion of an analog demodulator in accordance with an embodiment of the present invention.

Referring to FIG. 5, a block diagram depicting a portion of an analog demodulator 420 in accordance with an embodiment of the present invention is shown. A single analog demodulator shown in FIG. 5 can be used to demodulate every frequency, or a plurality of analog demodulators shown in FIG. 5 can be used to demodulate a plurality of frequencies. For example, when the transmitter 100 transmits N frequencies, N of the analog demodulator shown in FIG. 5 are used to demodulate each of the frequencies. A signal generator 510 is used to generate signals of corresponding frequencies.

An analog signal received from the receiver analog front end 410 can be passed through an optional amplifier (not shown) and then to two mixers 520I and 520Q. The mixer 520I receives a cosine signal outputted by the signal generator 510 and mixes it with the analog signal to generate a mixer signal, while the mixer 520Q receives a sine signal outputted by the signal generator 510 and mixes it with the analog signal to generate another mixer signal. The mixer signals outputted by the mixers 520I and 520Q are then sent to integrators 530I and 530Q, respectively. Then, the integrated signals are sent to squarers 540I and 540Q by the integrators 530I and 530Q, respectively. Finally, the outputs of the squarers 540I and 540Q are summed and then root-mean-squared by a "Root Mean Square (RMS) of Sum" element. As such, the signal strengths corresponding to the signal frequencies generated by the signal generator 510 can be obtained. After the signal strengths of all frequencies are obtained, the ratio(s) of the signal strengths of each two or arbitrary two frequencies and the overall signal strength can then be generated.

Figure 6:
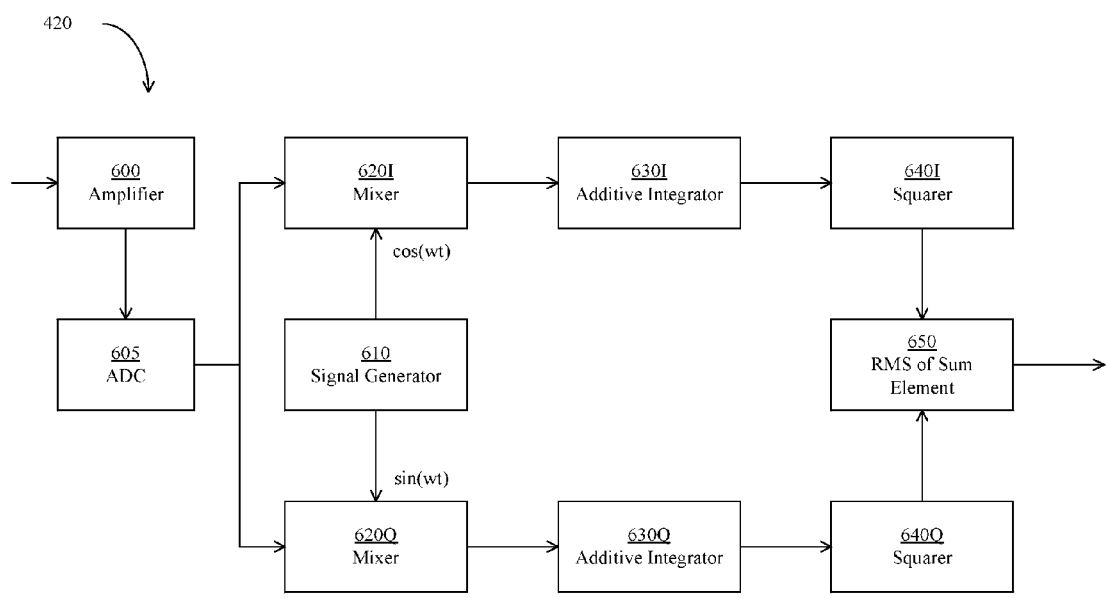
FIG. 6 is a block diagram depicting a portion of a digital demodulator in accordance with an embodiment of the present invention.

Referring to FIG. 6, a block diagram depicting a portion of a digital demodulator 420 in accordance with an embodiment of the present invention is shown. Compared to the embodiment shown in FIG. 5, the embodiment shown in FIG. 6 is carried out in a digital manner. Similarly, a single digital demodulator shown in FIG. 6 can be used to demodulate every frequency, or a plurality of the digital demodulators shown in FIG. 6 can be used to demodulate a plurality of frequencies. For example, when the transmitter 100 transmits N frequencies, N of the digital demodulator shown in FIG. 6 are used demodulate each of the frequencies. A signal generator 610 is used to generate digital signals of corresponding frequencies.

An analog signal received from the receiver analog front end 410 can be passed through an optional amplifier 600 and then to an analog-to-digital converter (ADC) 605. The sampling frequency of the ADC 605 will correspond to the frequency of the signal transmitted by the signal generator 610. In other words, when the ADC 605 is performing one sampling at a first phase, the signal generator 610 will send out first-phase signals to two mixers 620I and 620Q once. When the ADC 605 is performing one sampling at a second phase, the signal generator 610 will send out second-phase signals to two mixers 620I and 620Q once. The mixer 620I receives a cosine signal outputted by the signal generator 610 and multiplies it with the signal of the ADC 605 to generate a mixer signal, while the mixer 620Q receives a sine signal outputted by the signal generator 610 and multiplies it with the signal of the ADC 605 to generate another mixer signal. For example, the mixer 620I multiplies the first-phase signal with the first phase cosine signal to generate a mixer signal that is the product to the two signals. The mixer 620Q multiplies the first-phase signal with the first phase sine signal to generate another mixer signal that is the product to the two signals. The mixer signals outputted by the mixers 620I and 620Q are then outputted to addition integrators 630I and 630Q, respectively. Then, the addition-integrated signals are sent to squarers 640I and 640Q by the addition integrators 630I and 630Q, respectively. Finally, the outputs of the squarers 640I and 640Q are summed and root-mean-squared by a "Root Mean Square (RMS) of Sum" element. As such, the signal strengths corresponding to the signal frequencies generated by the signal generator 610 can be obtained. After the signal strengths of all frequencies are obtained, the ratios of the signal strengths of each two frequencies and the overall signal strength can then be generated. In FIG. 6, the signals after sampling by the ADC 605 are digital signals, signal processing following this stage are all digital signal processing.

Figure 7:
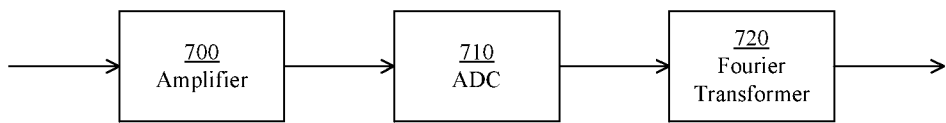
FIG. 7 is a block diagram depicting a portion of a digital demodulator in accordance with an embodiment of the present invention.

Referring to FIG. 7, a block diagram depicting a portion of a digital demodulator 420 in accordance with an embodiment of the present invention is shown. The embodiment shown in FIG. 7 is carried out in a digital manner, and a single digital demodulator shown in FIG. 7 can be used to demodulate every frequency. An analog signal received from the receiver analog front end 410 can be passed through an optional amplifier 700 and then to an analog-to-digital converter (ADC) 705. Then, the outputted digital signal is sent to a Fourier transformer 720 to demodulate the signal strength of each frequency on the frequency domain. The above Fourier transformer can be a digitalized Fast Fourier transformer.

Figure 8:
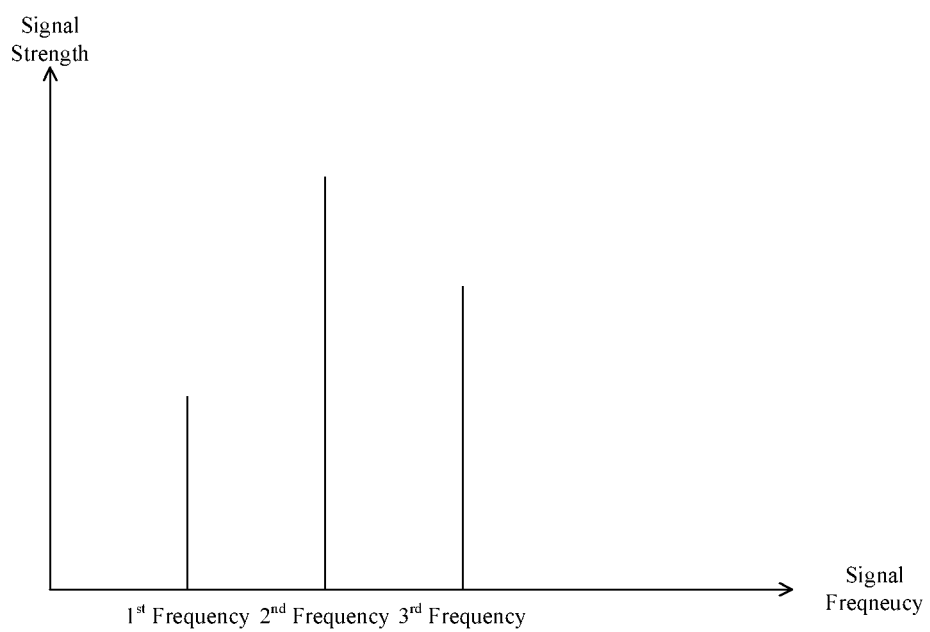
FIG. 8 is a schematic diagram depicting the result of demodulation according to the digital demodulator of FIG. 7.

Referring to FIG. 8, a schematic diagram depicting the result of demodulation according to the digital demodulator 420 of FIG. 7 is shown. The result shown in FIG. 8 is merely an illustration, in addition to being represented by a diagram; other kinds of data structure can be used to store the result of demodulation. The horizontal axis shown in FIG. 8 indicates the signal frequency, and the vertical axis thereof indicates the signal strength. The calculated result from the Fourier transformer 720 gives the signal strengths corresponding to N frequencies possibly transmitted by the transmitter 100. In an embodiment, a threshold can be set for the signal strength. Only a signal with strength greater than the threshold would be regarded as a signal having a corresponding frequency. When the signal strength of each frequency is obtained, the ratios of each two frequencies and the overall signal strength can then be calculated.

Although the embodiments of the three demodulators 420 provided in FIGS. 5 to 7 can be implemented in the touch processing device 330 shown in FIG. 3, but the present invention does not restrict that the touch processing device 330 must implement all the steps of the demodulator 420. In some embodiments, some steps of the demodulator 420 can be performed by the mainframe 340. It should be noted that although the embodiments of the demodulators 420 can be implemented by specific hardware, but one with ordinary skills in the art can appreciate that each elements of the demodulators 420 can be implemented through software or firmware. For example, the mixers can be implemented by multiplication, and the addition integrators can be implemented by addition. Multiplication and addition are among the most common operation instructions in ordinary processors.

Figure 9A:
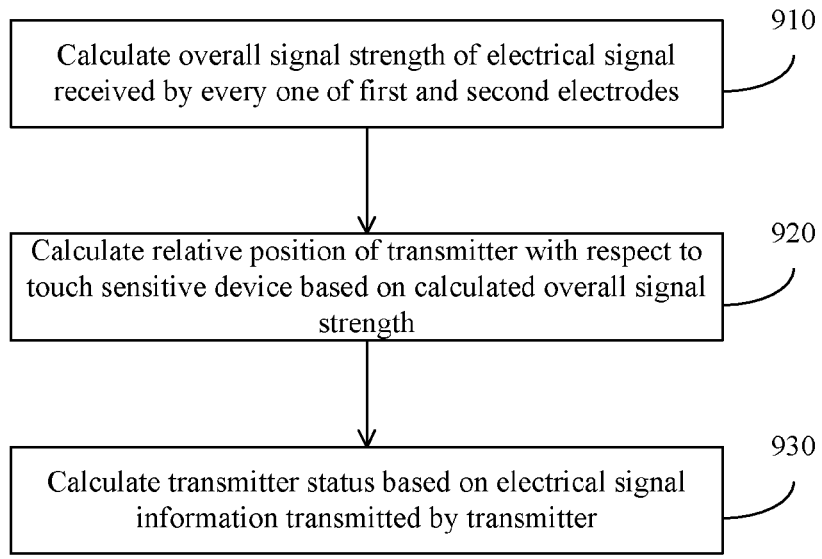
FIG. 9A is a flowchart illustrating a method for sensing a transmitter in accordance with an embodiment of the present invention.

Referring to FIG. 9A, a flowchart illustrating a method for sensing a transmitter in accordance with an embodiment of the present invention is shown. In step S910, the overall signal strength of the electrical signal received by every one of the first and second electrodes is calculated. Step 910 can be implemented using the embodiments shown in FIGS. 3 to 7. Then, in step 920, based on the calculated overall signal strength, a relative position of the transmitter with respect to a touch sensitive device is calculated. In an embodiment, the position of the transmitter is thought to be corresponding to the first and second electrodes having the largest overall signal strengths. In another embodiment, the position of the transmitter is thought to be corresponding to the centroid of adjacent first and second electrodes having the largest overall signal strengths, the magnitude of the masses of these electrodes correspond to the strength of the signals. Finally, in an optional step 930, based on information of the electrical signal transmitted by the transmitter, a transmitter operating status is calculated. One with ordinary skills in the art can appreciate that the implementation of step 930 can be deduced from the tables previously described.

Figure 9B:
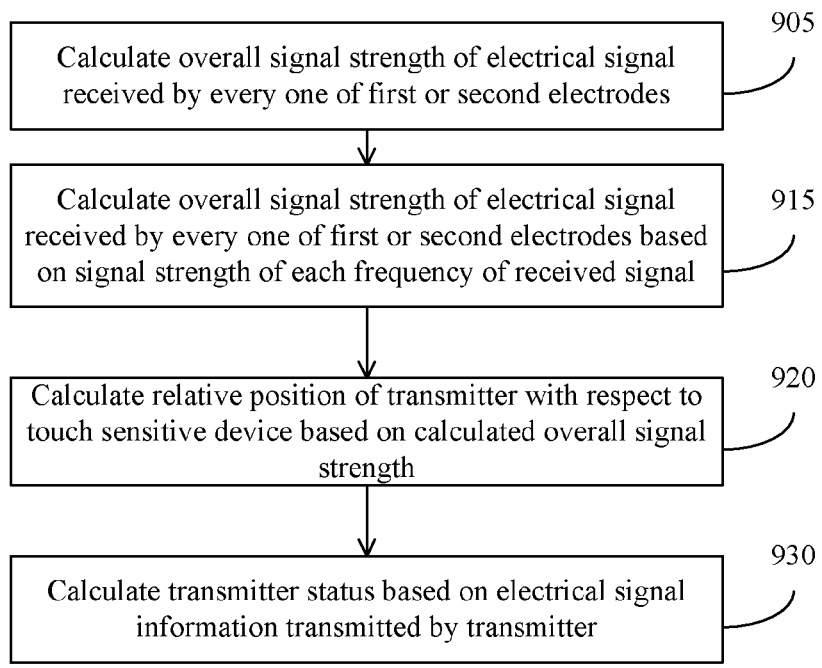
FIG. 9B is a flowchart illustrating a method for sensing a transmitter in accordance with an embodiment of the present invention.

Referring to FIG. 9B, a flowchart illustrating a method for sensing a transmitter in accordance with an embodiment of the present invention is shown. In step 905, the overall signal strength of the electrical signal received by every first or second electrode is calculated. Once the electrical signal received by a first or second electrode is demodulated, the frequencies of the signal transmitted by the transmitter can be known. For example, if the transmitter transmits a first frequency and a second frequency, but not a third frequency, then in the calculation of overall signal strengths of another electrode carried out in step 915, the calculation of the third frequency can be omitted. If the digital demodulator shown in FIG. 7 is employed, then the method shown in FIG. 9B is not required. However, if the demodulator described with respect to FIG. 5 or FIG. 6 is employed, and that the number of demodulators is not be enough to scan all frequencies in one go, then the method of FIG. 9B can save some time and calculation resources. Moreover, if after the calculations of the first electrodes or the second electrodes, no electrical signal transmitted by the transmitter is found, step 915 can be bypassed. On the contrary, if the electrical signal transmitted by the transmitter is found, then step 915 can calculate the overall signal strength of the electrical signal received by another electrode based on the signal strength of each frequency of the received electrical signal. The descriptions of the embodiment of FIG. 9A apply to the remaining steps 920 and 930.

It should be noted that in the processes of FIGS. 9A and 9B, if no cause-and-effect relationships or order between the steps are mentioned, then the present invention does not limit the order in which these steps are carried out. In addition, in steps 905, 910 and 915, the overall signal strength of the electrical signal of every first and/or second electrode(s) is mentioned. In an embodiment, if the touch sensitive system 300 includes only a single transmitter 100, the processes of FIGS. 9A and 9B will be modified to: if the overall strength of the electrical signal received by at least one first electrode and second electrode is calculated to be greater than a threshold, then execute steps 920 and 930.

In summary, one of the main principles of the present invention lies in detecting the signal strengths corresponding to a plurality of frequencies in the signal received by the first electrodes and the second electrodes in order to calculate the relative position of the transmitter with respect to the touch sensitive device, and to obtain the statues of various sensors on the transmitter based on the derived transmitter operating status. Moreover, the present invention may also make use of the touch sensitive electrodes of capacitive touch sensitive panels, thus allowing the same capacitive touch sensitive panel to perform both capacitive sensing and the detection of the transmitter. In other words, the same capacitive touch sensitive panel can be used for the detections of fingers, palms, as well as transmitter-type styli.

Figure 10:
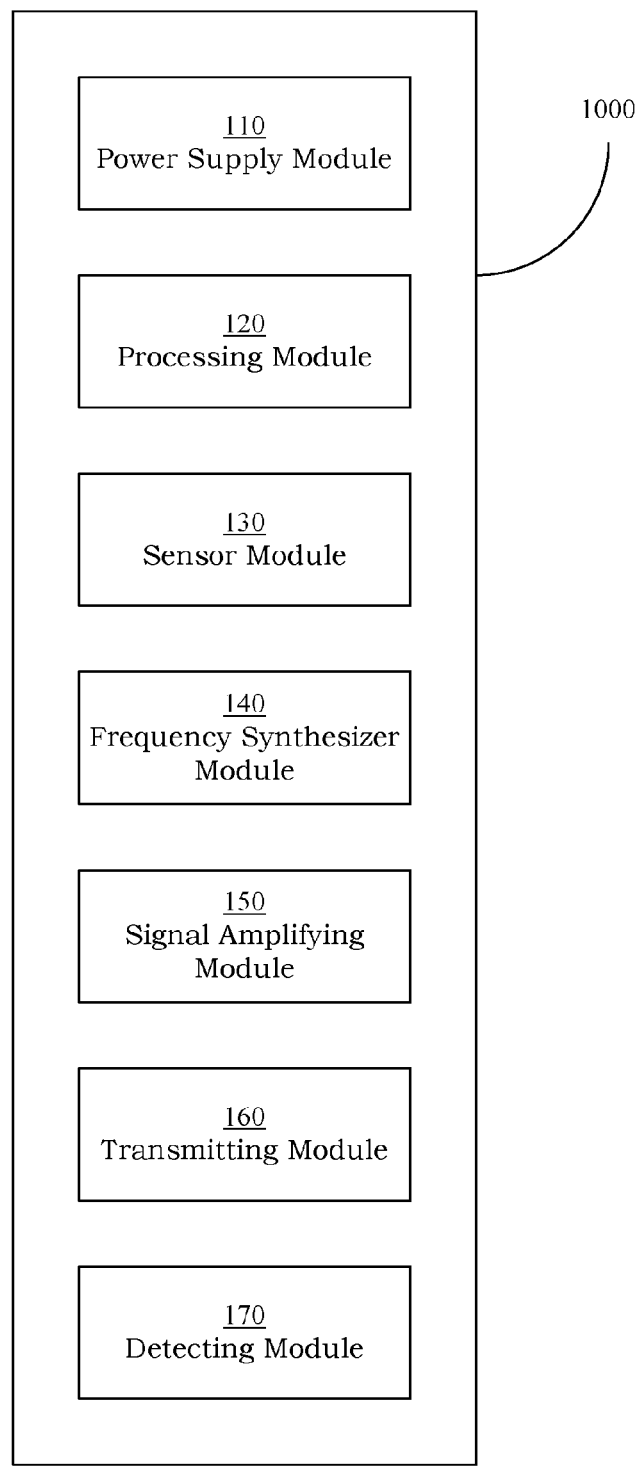
FIG. 10 is a schematic diagram illustrating a transmitter in accordance with an embodiment of the present invention.

Referring to FIG. 10, a schematic block diagram depicting a transmitter 1000 in accordance with an embodiment of the present invention is shown. The various elements in the transmitter 1000 shown in FIG. 10, unless specified otherwise, are the same as or similar to those in the transmitter 100 shown in FIG. 1. In addition, in the touch sensitive system 300 shown in FIG. 3, the transmitter 100 may also be replaced by transmitter 1000.

The transmitter 1000 further includes a detecting module 170. The detecting module 170 is configured to receive a signal when the transmitting module 160 is not transmitting the electrical signal and detect an interference signal coherent to the electrical signal from the received signal. If an interference signal coherent to the electrical signal is detected, the processing module 120 will change one or more first frequencies being interfered in the electrical signal into one or more second frequencies.

In an embodiment, the received signal can be received from any location outside the transmitter 1000. For example, the casing of the transmitter 1000 can be used for receiving the signal, especially from the human body holding the transmitter 1000. In another embodiment, the signal can be received from where the transmitter 1000 touches the touch sensitive panel 320. In a particular embodiment, the place where the transmitter 1000 touches the touch sensitive panel 320 is where the transmitting module 160 transmits the electrical signal. Since the detecting module 170 conducts detection at the times when the transmitting module 160 is not transmitting the electrical signal, so the conductor or antenna used for transmitting the electrical signal can be used in a time sharing manner.

Referring to Table 6 below, transmitter operating statuses and corresponding frequency combinations are shown. In the embodiment shown in Table 6, the same transmitter operating status may be represented by two different frequencies. The touch processing device 330 is able to interpret the correct transmitter operating status regardless of which frequencies are used to represent it.

TABLE 6

|  | First Frequency (combination) | Second Frequency (combination) |
| --- | --- | --- |
| First Transmitter Operating Status | First Frequency | Second Frequency |
| Second Transmitter Operating Status | Third Frequency | Fourth Frequency |

Although only two frequency combinations for representing the same transmitter operating status are shown, three or more different frequency combinations can be used to represent the same transmitter operating status. When the detecting module 170 detects an interference signal coherent to the electrical signal from the received signal, the processing module 120 may use to another combination of frequencies instead.

In the embodiment shown in Table 6, the substitution of the frequency combination are both one to one, that is, the first frequency is replaced with the second frequency and the third frequency is replaced with the fourth frequency, or vice versa. In an embodiment shown in Table 7 below, instead of just one frequency, a plurality of frequencies can be mixed to represent a single transmitter operating status.

TABLE 7

|  | 1st Frequency (combination) | 2nd Frequency (combination) |
| --- | --- | --- |
| First Transmitter Operating Status | 5th Frequency + 6th Frequency | 7th Frequency |
| Second Transmitter Operating Status | 8th Frequency + 9th Frequency | 10th Frequency + 11th Frequency |
| Third Transmitter Operating Status | 12th Frequency | 13th Frequency + 14th Frequency + 15th Frequency |
| Fourth Transmitter Operating Status | 16th Frequency + 17th Frequency | 16th Frequency + 18th Frequency 17th Frequency + 18th Frequency |
| Fifth Transmitter Operating Status | 19th Frequency + 20th Frequency | 21th Frequency + 22th Frequency + 23th Frequency |

There are two frequency combinations correspond to the first transmitter operating status in the embodiment shown by Table 7; a mix of the 5th and the 6th frequencies is the first frequency combination, and the 7th frequency is the second frequency combination. In this example, if the interference signal includes the 5th or the 6th frequency, the processing module 120 will stop mixing them into the electrical signal, and uses the 7th frequency as the electrical signal instead. On the other hand, if the interference signal includes the 7th frequency, the processing module 120 will using the 7th frequency as the electrical signal and mixes the 5th and the 6th frequencies together as the electrical signal.

In the example of the second transmitter operating status, if the interference signal includes the 8th or the 9th frequency, then the 10th and the 11th frequencies are mixed together as the electrical signal. On the other hand, if the interference signal includes the 10th or the 11th frequency, then the 8th and the 9th frequencies are mixed together as the electrical signal. In the example of the third transmitter operating status, it is demonstrated that the replacement frequency combination is not limited to just two frequencies, there can be three or more frequencies.

In the example of the fourth transmitter operating status, in the first frequency combination, there are the 16th and the 17th frequencies. If the interference signal includes the 16th frequency but not the 17th frequency, then the 16th frequency is replaced with the 18th frequency. If the interference signal includes the 17th frequency but not the 16th frequency, then the 17th frequency is replaced with the 18th frequency. Furthermore, if the signal strength of the 16th frequency is greater than that of the 17th frequency in the interference signal, then the 16th frequency is replaced with the 18th frequency. Furthermore, if the signal strength of the 17th frequency is greater than that of the 16th frequency in the interference signal, then the 17th frequency is replaced with the 18th frequency.

In Table 7, although there are two kinds of second frequency combination corresponding to the fourth transmitter operating status, there are effectively three different frequency combinations corresponding to the fourth transmitter operating status, that is, out of the 16th, the 17th and the 18th frequencies, two are selected for mixing. When one of the three frequencies is included in the interference signal, or when the signal strength of one of the frequencies is greater than the other two in the interference signal, the electrical signal mixed from the other two frequencies is used to represent the transmitter operating status. In an embodiment of the present invention, mixing from a plurality of frequencies can be used to represent one transmitter operating status. When the interference signal includes one or more of these frequencies, then the other frequencies with no or less interference are used instead.

As described previously, when a plurality of frequencies are used to describe a sensor with n possible transmitter operating statuses, the signal strength of each of the frequencies can be adjusted to indicate these statuses. For example, the 4th transmitter operating status may correspond to the degree of pressure experienced by the transmitter 1000. Thus, when mixing the 16th and the 18th frequencies together, if the ratio of the signal strengths of these two is 6:4, it indicates the degree of pressure experienced by the transmitter 1000 is 60%. If the interference signal includes the 16th frequency and that the 18th frequency is used as a result of this, and if the ratio of the signal strengths of the 18th and the 17th frequencies is 6:4, it may also indicate the degree of pressure experienced by the transmitter 1000 is 60%. Similarly, if the interference signal includes the 17th frequency and that the 18th frequency is used as a result of this, and if the ratio of the signal strengths of the 16th and the 18th frequencies is 6:4, it may also indicate the degree of pressure experienced by the transmitter 1000 is 60%.

Another embodiment is the second transmitter operating status in Table 7. For example, when mixing the 8th and the 9th frequencies together, if the ratio of the signal strengths of these two is 6:4, it indicates the degree of pressure experienced by the transmitter 1000 is 60%. If the interference signal includes the 8th and/or 9th frequency and that the processing module 120 uses the second frequency combination as the electrical signal as a result of this, and if the ratio of the signal strength of the 10th and the 11th frequencies is 6:4, it may also indicate the degree of pressure experienced by the transmitter 1000 is 60%, and vice versa.

In the example of the fifth transmitter operating status in Table 7, the first frequency combination includes two frequencies and the replacement second frequency combination includes three frequencies. In other words, each of the replacement second frequency combinations may include a plurality of frequencies, the quantity of which may vary.

In order to avoid mutual interference, in an embodiment, all of the frequencies in the frequency synthesizer module 140 are all not mutually resonant. Thus, when the detecting module 170 is trying to detect an interference signal, the frequencies that it looks for are all not mutually resonant. In another embodiment, at least the frequencies corresponding to the same transmitter operating status are not mutually resonant. In still another embodiment, at least the frequencies in frequency combinations corresponding to the same transmitter operating status are not mutually resonant. In some embodiments, the frequency synthesizer module 140 and the detecting module 170 may share the frequency generator, but the present invention does not require the detecting module 170 to be able to detect all the frequencies of the frequency synthesizer module 140, it may only detect some of the frequencies of the frequency synthesizer module 140.

In an embodiment, the detecting module 170 may include, similar to that shown in FIG. 4, a receiver front end and a demodulator. The demodulator may be the embodiment shown in FIG. 5, 6 or 7. As described before, the signal generator of the demodulator may be shared with the frequency synthesizer module 140. The present invention does not limit the demodulator to those described in the previous embodiments, as long as it is capable of detecting an interference signal of a particular frequency and its signal strength in a received signal. If the signal strength of that particular frequency is greater than a particular threshold, then the processing module 120 determines that the particular frequency is included in the interference signal.

In an embodiment, the way in which the detecting module 170 detects the interference signal is the same as that used by the touch sensitive device in order to achieve the same results. For example, when the touch sensitive device uses the digital demodulator of FIG. 5, the detecting module 170 also uses the digital demodulator of FIG. 5. Similarly, when the touch sensitive device uses the digital demodulator of FIG. 6, the detecting module 170 also uses the digital demodulator of FIG. 6. When the touch sensitive device uses the digital demodulator of FIG. 7, the detecting module 170 also uses the digital demodulator of FIG. 7. However, the present invention does not require the transmitter 1000 in the touch sensitive system 300 to use the same detection method as the touch sensitive device. In another embodiment, when the touch sensitive device uses the digital demodulator of FIG. 5, the detecting module 170 also uses the digital demodulator of FIG. 6. It should be noted that the touch sensitive device detects the electrical signal when the transmitting module 160 is transmitting the electrical signal. On the other hand, the detecting module 170 detects any interference signal in the received signal when the transmitting module 160 is not transmitting the electrical signal.

First, when the electrical signal includes a first frequency combination that includes a plurality of first frequencies, and the received signal includes an interference signal of the plurality of first frequencies, then the one with the largest interference signal strength among the plurality of first frequencies is replaced first. Alternatively, the one with the maximum weighted value among the plurality of first frequencies is replaced first. As another example, based on a predetermined order, the most former one of the plurality of first frequencies in that order is replaced first.

Figure 11:
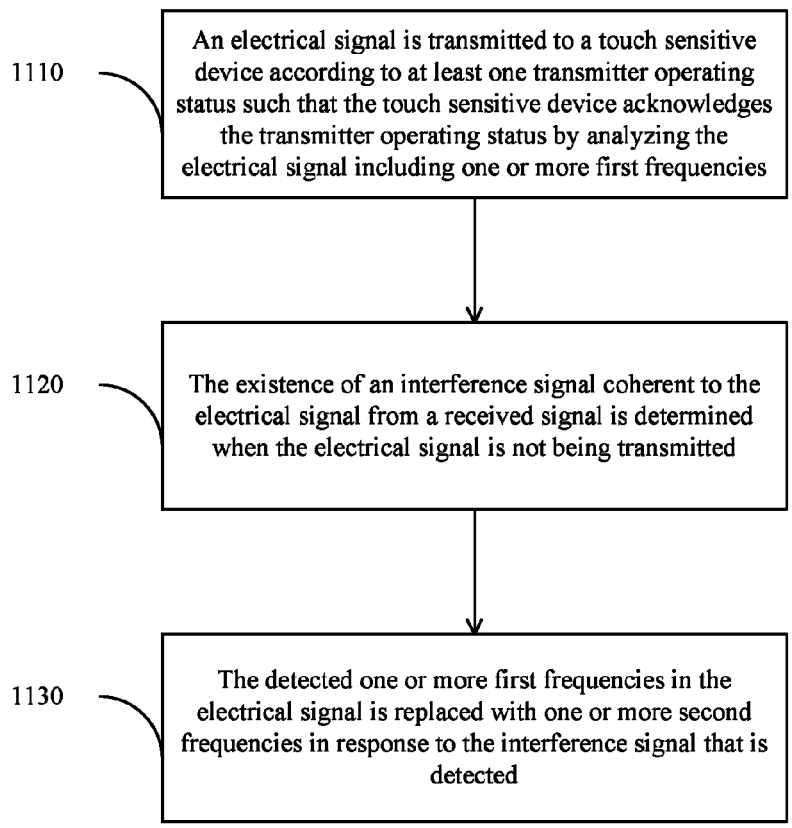
FIG. 11 is a flowchart illustrating a transmitting method of a transmitter in accordance with an embodiment of the present invention.

Referring to FIG. 11, a transmitting method applicable to a transmitter in accordance with an embodiment of the present invention is shown. The embodiment shown in FIG. 11 is described with reference to the descriptions above. The transmitting method includes the following steps:

Step 1110: An electrical signal is transmitted to a touch sensitive device according to at least one transmitter operating status such that the touch sensitive device acknowledges the transmitter operating status by analyzing the electrical signal including one or more first frequencies.

Step 1120: The existence of an interference signal coherent to the electrical signal from a received signal is determined when the electrical signal is not being transmitted.

Step 1130: The detected one or more first frequencies in the electrical signal is replaced with one or more second frequencies in response to the interference signal that is detected.

In summary, the main spirit of the present invention lies in determining if an interference signal existing in the touch sensitive system is coherent to the electrical signal sent by the transmitter. When there is coherency, one or more frequencies making up the electrical signal is/are replaced to avoid interference.

What is claimed is:

1. A transmitter comprising:
    a transmitting module configured to transmit an electrical signal to a touch sensitive device according to at least one transmitter operating status such that the touch sensitive device acknowledges the transmitter operating status by analyzing the electrical signal including one or more first frequencies;
    a detecting module configured to detect an interference signal coherent to the electrical signal from a received signal external to the transmitter when the transmitting module is not transmitting the electrical signal; and
    a processing module configured to replace the detected one or more first frequencies with one or more second frequencies in response to the interference signal being detected by the detecting module, wherein the step of replacing the one or more first frequencies with the one or more second frequency includes one of the following:
        when the electrical signal includes one first frequency and when the received signal includes an interference signal of the first frequency, the electrical signal after frequency substitution includes a plurality of the second frequencies;
        when the electrical signal includes a plurality of the first frequencies and when the received signal includes an interference signal of a plurality of the first frequencies, the electrical signal after frequency substitution includes one second frequency; and
        when the electrical signal includes a plurality of the first frequencies and when the received signal includes an interference signal of a plurality of the first frequencies, the electrical signal after frequency substitution includes a plurality of the second frequencies.

2. The transmitter of claim 1, wherein the detecting module further includes at least one demodulator for determining if the first frequency is included in the received signal, the demodulator includes:
a signal generator for generating an in-phase signal and an orthogonal signal, wherein the frequency of the in-phase signal and the orthogonal signal is the first frequency;
at least a mixer for mixing the in-phase signal with the received signal to generate an in-phase analog signal, and mixing the orthogonal signal with the received signal to generate an orthogonal analog signal;
at least an integrator for performing integration on the in-phase analog signal to generate an in-phase integration signal, and performing integration on the orthogonal analog signal to generate an orthogonal integration signal;
at least a squarer for calculating the square of the in-phase integration signal and the square of the orthogonal integration signal; and
at least a Root Mean Square (RMS) of Sum element for calculating the root mean square of the sum of the square of the in-phase integration signal and the square of the orthogonal integration signal to obtain the signal strength corresponding to the first frequency.

3. The transmitter of claim 1, wherein the detecting module further includes at least one demodulator for determining if the first frequency is included in the received signal, the demodulator includes:
an analog-to-digital converter (ADC) for performing analog-to-digital conversion on the received signal to produce a digital received signal;
a signal generator for generating an in-phase signal and an orthogonal signal, wherein the frequency of the in-phase signal and the orthogonal signal is the first frequency;
at least a mixer for mixing the in-phase signal with the digital received signal to generate an in-phase digital signal, and mixing the orthogonal signal with the digital received signal to generate an orthogonal digital signal;
at least an addition integrator for performing addition integration on the in-phase digital signal to generate an in-phase integration signal, and performing integration on the orthogonal digital signal to generate an orthogonal integration signal;
at least a squarer for calculating the square of the in-phase integration signal and the square of the orthogonal integration signal; and
at least a Root Mean Square (RMS) of Sum element for calculating the root mean square of the sum of the square of the in-phase integration signal and the square of the orthogonal integration signal to obtain the signal strength corresponding to the first frequency.

4. The transmitter of claim 1, wherein the detecting module further includes at least one demodulator for determining if the first frequency is included in the received signal, the demodulator includes:
an analog-to-digital converter (ADC) for performing analog-to-digital conversion on the received signal to produce a digital received signal; and
a Fourier Transformer for performing Fourier Transform on the digital received signal to generate the signal strength corresponding to the first frequency.

5. The transmitter of claim 1, wherein the electrical signal including the first frequency and the electrical signal including the second frequency correspond to the same transmitter operating status.

6. The transmitter of claim 1, wherein when the received signal includes a plurality of the first frequencies and when the electrical signal after frequency substitution includes a plurality of the second frequencies, the number of the plurality of the first frequencies is different from that of the plurality of the second frequencies.

7. The transmitter of claim 1, wherein the step of replacing the one or more first frequencies with the one or more second frequency includes one of the following:
when the electrical signal includes a plurality of the first frequencies and when the received signal includes an interference signal of a plurality of the first frequencies, the frequency with the largest interference signal strength among the plurality of first frequencies is replaced first;
when the electrical signal includes a plurality of the first frequencies and when the received signal includes an interference signal of a plurality of the first frequencies, the frequency with the largest weighted value among the plurality of first frequencies is replaced first; and
when the electrical signal includes a plurality of the first frequencies and when the received signal includes an interference signal of a plurality of the first frequencies, based on a predetermined order, the most former one of the plurality of first frequencies in that order is replaced first.

8. The transmitter of claim 1, wherein the first frequency and the second frequency are not mutually resonant.

9. The transmitter of claim 1, wherein the detecting module is used to detect the received signal from a contact area between the transmitter with the touch sensitive device.

10. The transmitter of claim 1, further comprising a sensor module, wherein the transmitter operating status is produced based on a sensor status inside the sensor module.

11. The transmitter of claim 10, wherein a sensor inside the sensor module includes one of the following:
a button;
a knob;
a pressure sensor;
an accelerometer; and
a gyroscope.

12. A transmitting method applicable to a transmitter comprising the following steps of:
transmitting an electrical signal to a touch sensitive device according to at least one transmitter operating status such that the touch sensitive device acknowledges the transmitter operating status by analyzing the electrical signal including one or more first frequencies;
determining if an interference signal coherent to the electrical signal is included in a received signal external to the transmitter when the electrical signal is not being transmitted; and
replacing the detected one or more first frequencies in the electrical signal with one or more second frequencies in response to the interference signal being detected, wherein the step of replacing the one or more first frequencies with the one or more second frequency includes one of the following:
when the electrical signal includes one first frequency and when the received signal includes an interference signal of the first frequency, the electrical signal after frequency substitution includes a plurality of the second frequencies;

when the electrical signal includes a plurality of the first frequencies and when the received signal includes an interference signal of a plurality of the first frequencies, the electrical signal after frequency substitution includes one second frequency; and when the electrical signal includes a plurality of the first frequencies and when the received signal includes an interference signal of a plurality of the first frequencies, the electrical signal after frequency substitution includes a plurality of the second frequencies.

13. The transmitting method of claim 12, further comprising the following steps for determining if the received signal includes the first frequency:

generating an in-phase signal and an orthogonal signal, wherein the frequency of the in-phase signal and the orthogonal signal is the first frequency;

mixing the in-phase signal with the received signal to generate an in-phase analog signal, and mixing the orthogonal signal with the received signal to generate an orthogonal analog signal;

performing integration on the in-phase analog signal to generate an in-phase integration signal, and performing integration on the orthogonal analog signal to generate an orthogonal integration signal;

calculating the square of the in-phase integration signal and the square of the orthogonal integration signal; and calculating the root mean square of the sum of the square of the in-phase integration signal and the square of the orthogonal integration signal to obtain the signal strength corresponding to the first frequency.

14. The transmitting method of claim 12, further comprising the following steps for determining if the received signal includes the first frequency:

performing analog-to-digital conversion on the received signal to produce a digital received signal;

generating an in-phase signal and an orthogonal signal, wherein the frequency of the in-phase signal and the orthogonal signal is the first frequency;

mixing the in-phase signal with the digital received signal to generate an in-phase digital signal, and mixing the orthogonal signal with the digital received signal to generate an orthogonal digital signal;

performing addition integration on the in-phase digital signal to generate an in-phase integration signal, and performing integration on the orthogonal digital signal to generate an orthogonal integration signal;

calculating the square of the in-phase integration signal and the square of the orthogonal integration signal; and calculating the root mean square of the sum of the square of the in-phase integration signal and the square of the orthogonal integration signal to obtain the signal strength corresponding to the first frequency.

15. The transmitting method of claim 12, further comprising the following steps for determining if the received signal includes the first frequency:

performing analog-to-digital conversion on the received signal to produce a digital received signal; and performing Fourier Transform on the digital received signal to generate the signal strength corresponding to the first frequency.

16. The transmitting method of claim 12, wherein the electrical signal including the first frequency and the electrical signal including the second frequency correspond to the same transmitter operating status.

17. The transmitting method of claim 12, wherein when the received signal includes a plurality of the first frequencies and when the electrical signal after frequency substitution includes a plurality of the second frequencies, the number of the plurality of the first frequencies is different from that of the plurality of the second frequencies.

18. The transmitting method of claim 12, wherein the step of replacing the one or more first frequencies with the one or more second frequency includes one of the following:

when the electrical signal includes a plurality of the first frequencies and when the received signal includes an interference signal of a plurality of the first frequencies, the frequency with the largest interference signal strength among the plurality of first frequencies is replaced first;

when the electrical signal includes a plurality of the first frequencies and when the received signal includes an interference signal of a plurality of the first frequencies, the frequency with the largest weighted value among the plurality of first frequencies is replaced first; and when the electrical signal includes a plurality of the first frequencies and when the received signal includes an interference signal of a plurality of the first frequencies, based on a predetermined order, the most former one of the plurality of first frequencies in that order is replaced first.

19. The transmitting method of claim 12, wherein the first frequency and the second frequency are not mutually resonant.

20. The transmitting method of claim 12, wherein the received signal is from a contact area between the transmitter and the touch sensitive device.

21. The transmitting method of claim 12, further comprising a sensor module, wherein the transmitter operating status is produced based on a sensor status inside the sensor module.

22. The transmitting method of claim 21, wherein a sensor inside the sensor module includes one of the following:
a button;
a knob;
a pressure sensor;
an accelerometer; and
a gyroscope.

23. A touch sensitive system comprising:
a touch sensitive device; and
a transmitter including:
a transmitting module configured to transmit an electrical signal to the touch sensitive device according to at least one transmitter operating status such that the touch sensitive device acknowledges the transmitter operating status by analyzing the electrical signal including one or more first frequencies;
a detecting module configured to detect an interference signal coherent to the electrical signal from a received signal external to the transmitter when the transmitting module is not transmitting the electrical signal; and
a processing module configured to replace the detected one or more first frequencies with one or more second frequencies in response to the interference signal being detected by the detecting module, wherein the step of replacing the one or more first frequencies with the one or more second frequency includes one of the following:
when the electrical signal includes one first frequency and when the received signal includes an interference signal of the first frequency, the electrical signal after frequency substitution includes a plurality of the second frequencies;

when the electrical signal includes a plurality of the first frequencies and when the received signal includes an interference signal of a plurality of the first frequencies, the electrical signal after frequency substitution includes one second frequency; and when the electrical signal includes a plurality of the first frequencies and when the received signal includes an interference signal of a plurality of the first frequencies, the electrical signal after frequency substitution includes a plurality of the second frequencies.

24. The touch sensitive system of claim 23, wherein the touch sensitive device obtains a relative position of the transmitter with respect to the touch sensitive device based on the electrical signal.

25. The touch sensitive system of claim 23, wherein the method for analyzing the electrical signal used by the touch sensitive device is the same as the detection method used by the detecting module.

26. The touch sensitive system of claim 23, wherein the touch sensitive device detects the electrical signal when the transmitting module is transmitting the electrical signal.

27. The touch sensitive system of claim 23, wherein the transmitter further includes a sensor module, wherein the transmitter operating status is produced based on a sensor status inside the sensor module.

28. The touch sensitive system of claim 27, wherein a sensor inside the sensor module includes one of the following:

a button;

a knob;

a pressure sensor;

an accelerometer; and a gyroscope.

* * * * *